United States Patent
Orita et al.

(10) Patent No.: US 11,441,632 B2
(45) Date of Patent: Sep. 13, 2022

(54) ROTARY DAMPER HAVING SIMPLE SELF-STANDING MECHANISM

(71) Applicant: Tok, Inc., Tokyo (JP)

(72) Inventors: Nobutoshi Orita, Tokyo (JP);
Takayuki Sakamaki, Tokyo (JP)

(73) Assignee: TOK, INC., Tokyo (JP)

( * ) Notice: Subject to any disclaimer, the term of this patent is extended or adjusted under 35 U.S.C. 154(b) by 0 days.

(21) Appl. No.: 16/612,665

(22) PCT Filed: Apr. 5, 2018

(86) PCT No.: PCT/JP2018/014555
§ 371 (c)(1),
(2) Date: Nov. 11, 2019

(87) PCT Pub. No.: WO2018/207511
PCT Pub. Date: Nov. 15, 2018

(65) Prior Publication Data
US 2020/0096074 A1 Mar. 26, 2020

(30) Foreign Application Priority Data

May 11, 2017 (JP) .............................. JP2017-095087

(51) Int. Cl.
*F16F 9/14* (2006.01)
*F16F 9/516* (2006.01)
(Continued)

(52) U.S. Cl.
CPC ............. *F16F 9/145* (2013.01); *F16F 9/369* (2013.01); *F16F 9/516* (2013.01); *A47K 13/12* (2013.01);
(Continued)

(58) Field of Classification Search
CPC .... F16F 9/12; F16F 9/145; F16F 9/516; F16F 9/369; F16F 2222/12; F16F 2232/02; F16F 2234/02; A47K 13/12
See application file for complete search history.

(56) References Cited

U.S. PATENT DOCUMENTS 5,255,396 A * 10/1993 Miyahara ............... A47K 13/10
4/246.2
6,913,125 B2 * 7/2005 Hayashi .................. F16D 57/02
16/51

(Continued)

FOREIGN PATENT DOCUMENTS

| JP | 2005-098441 A | 4/2005 |
| JP | 2009-293697 A | 12/2009 |
| JP | 2011-163472 A | 8/2011 |
| JP | 2015-227719 A | 12/2015 |

OTHER PUBLICATIONS

English language International Search Report for PCT/JP2018/014555, dated Jun. 19, 2018 (2 pages).

*Primary Examiner* — Melody M Burch
(74) *Attorney, Agent, or Firm* — Flynn Thiel, P.C.

(57) ABSTRACT

A rotary damper having a simple self-standing mechanism which does not cause an inconvenience such as bounce of an opening/closing member at an end of an opening operation of the opening/closing member such as toilet lid is provided. A rotary damper has a housing, a shaft, a vane, a sliding member, an O ring, and a cap as main components. A shaft portion, formed in a pressure chamber of the housing, includes a blade portion protruding in an axial direction of the shaft portion. A cutout portion is formed in a center portion between both ends of the blade portion. On another side surface of the blade portion, a first groove is formed in a circumferential direction from a base of the blade portion (Continued)

to the outer periphery of the shaft portion. A second groove is formed on the outer periphery of the shaft portion spaced from the first groove.

3 Claims, 12 Drawing Sheets

(51) Int. Cl.
*F16F 9/36* (2006.01)
*A47K 13/12* (2006.01)

(52) U.S. Cl.
CPC ....... *F16F 2222/12* (2013.01); *F16F 2232/02* (2013.01); *F16F 2234/02* (2013.01)

(56) References Cited

U.S. PATENT DOCUMENTS

| | | | | |
|---|---|---|---|---|
| 2002/0179387 | A1* | 12/2002 | Orita | F16F 9/145 |
| | | | | 188/290 |
| 2003/0150678 | A1* | 8/2003 | Iwashita | F16F 9/145 |
| | | | | 188/296 |
| 2005/0072639 | A1* | 4/2005 | Orita | F16F 9/48 |
| | | | | 188/307 |
| 2006/0081430 | A1* | 4/2006 | Iwashita | F16F 9/145 |
| | | | | 188/290 |
| 2008/0253893 | A1* | 10/2008 | Nishiyama | F16F 9/145 |
| | | | | 416/169 R |

* cited by examiner

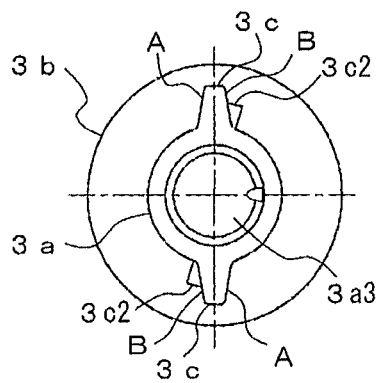
Fig. 5A
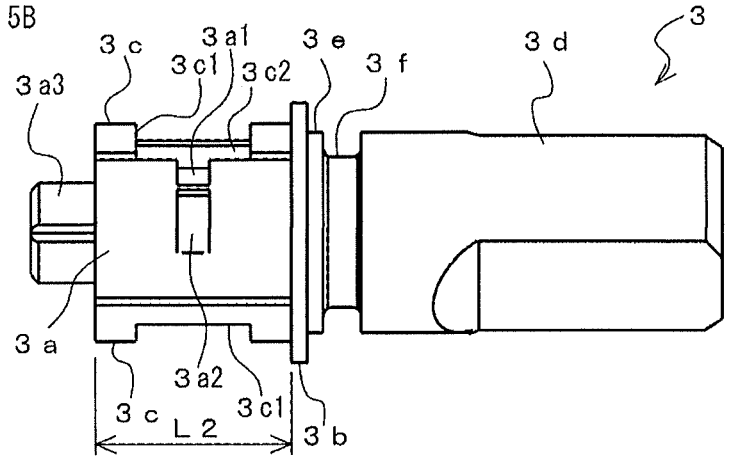
Fig. 5B
Fig 6
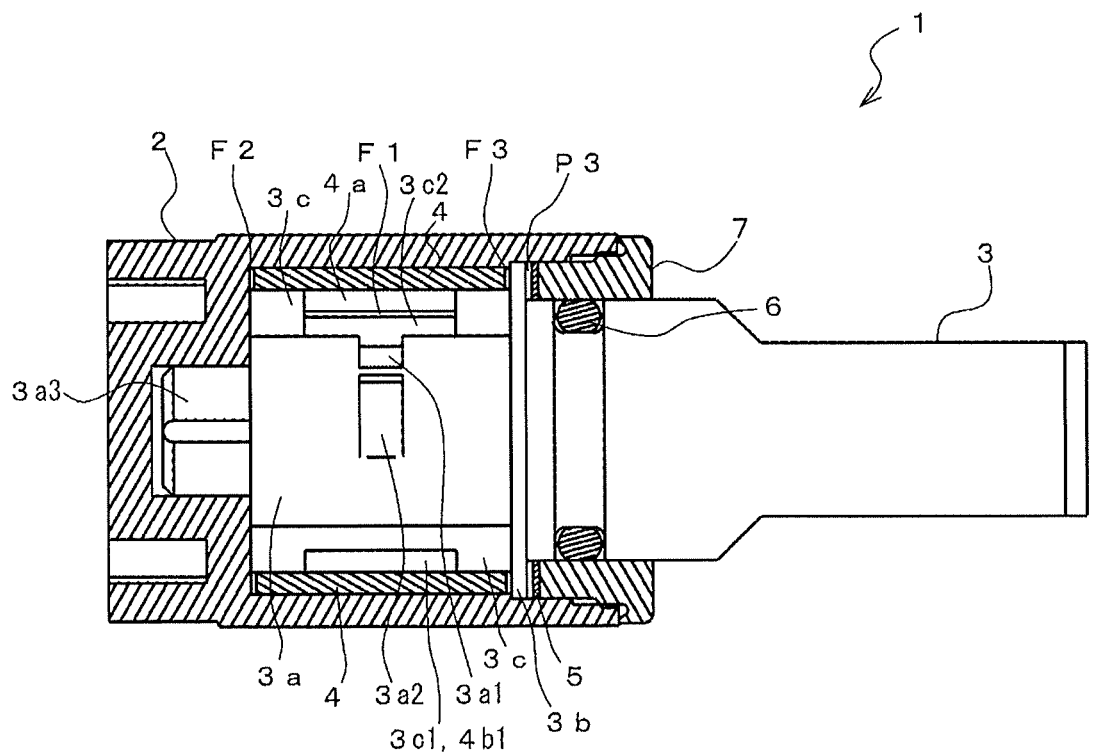

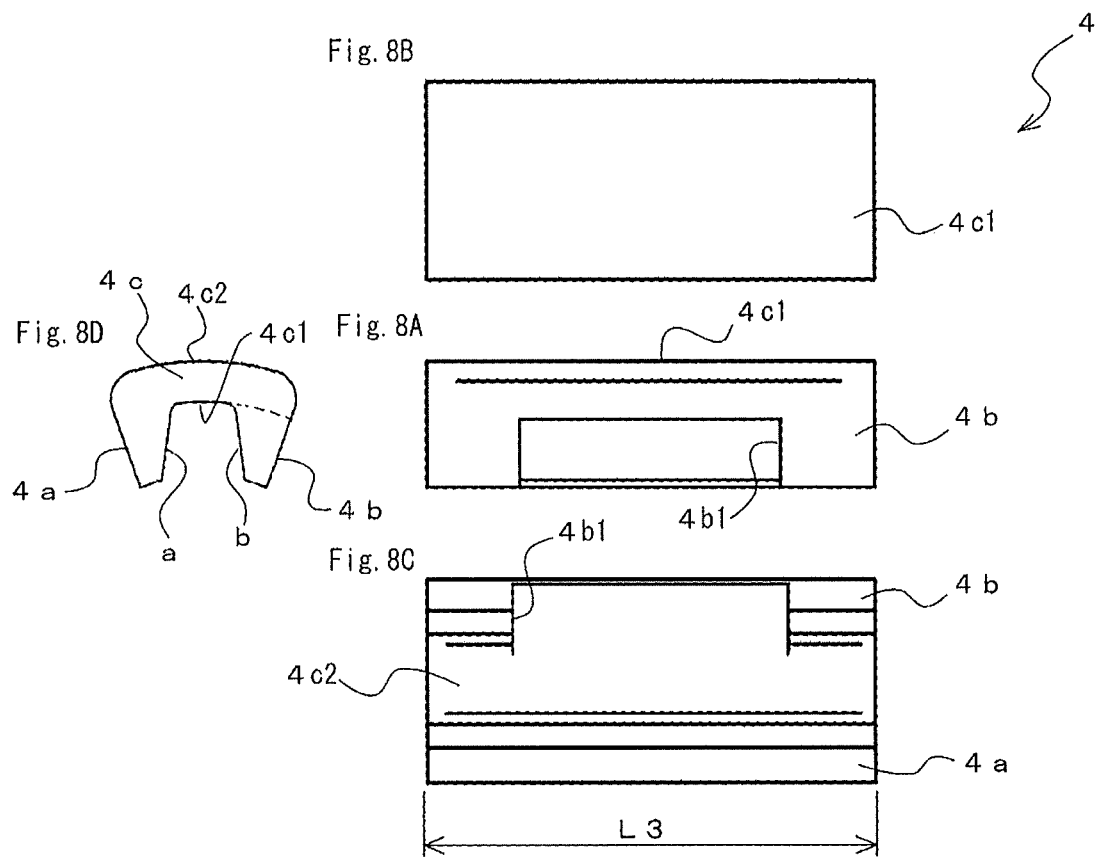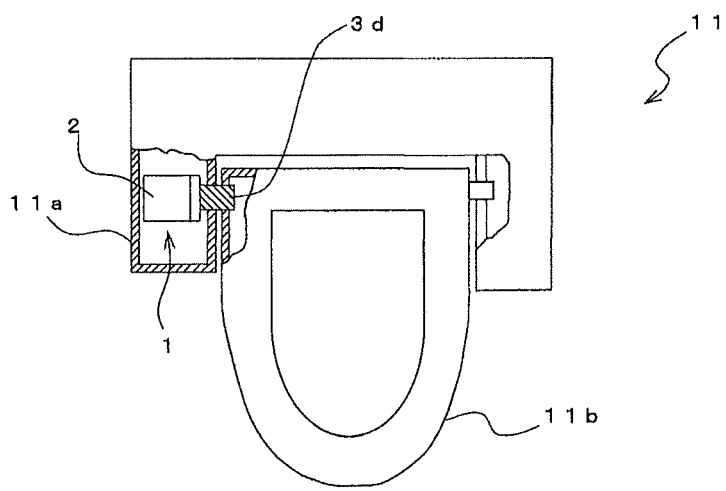

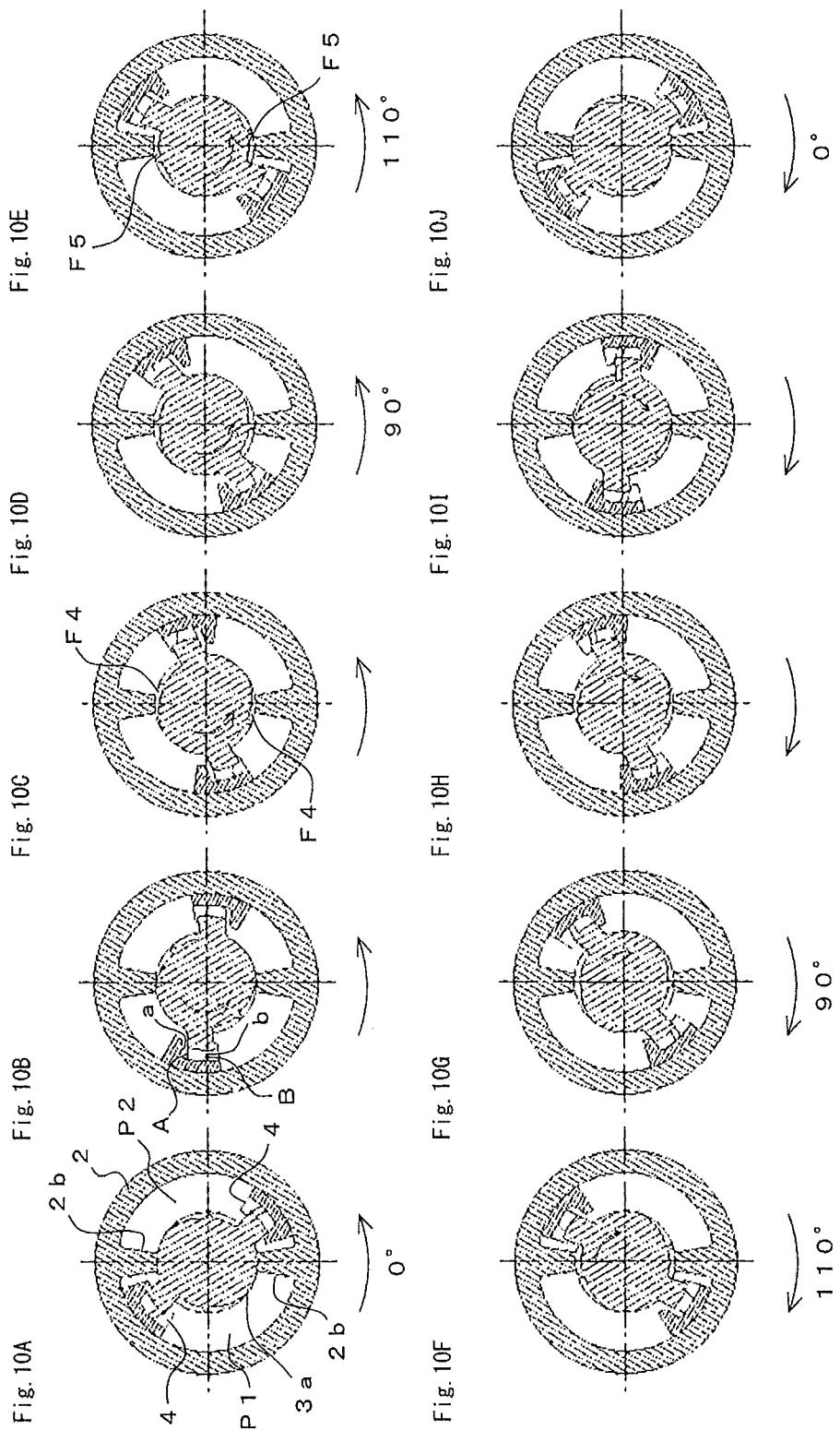

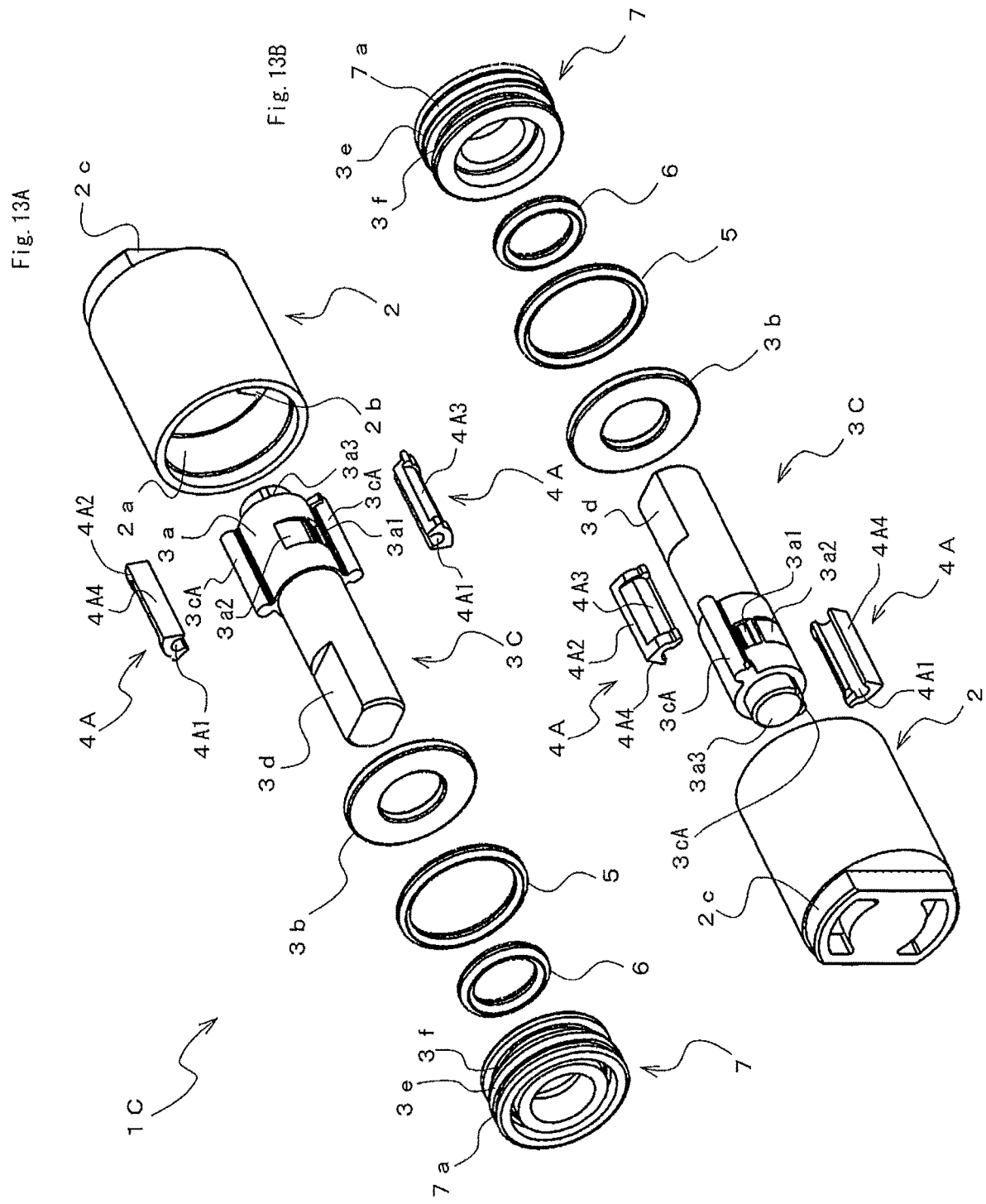

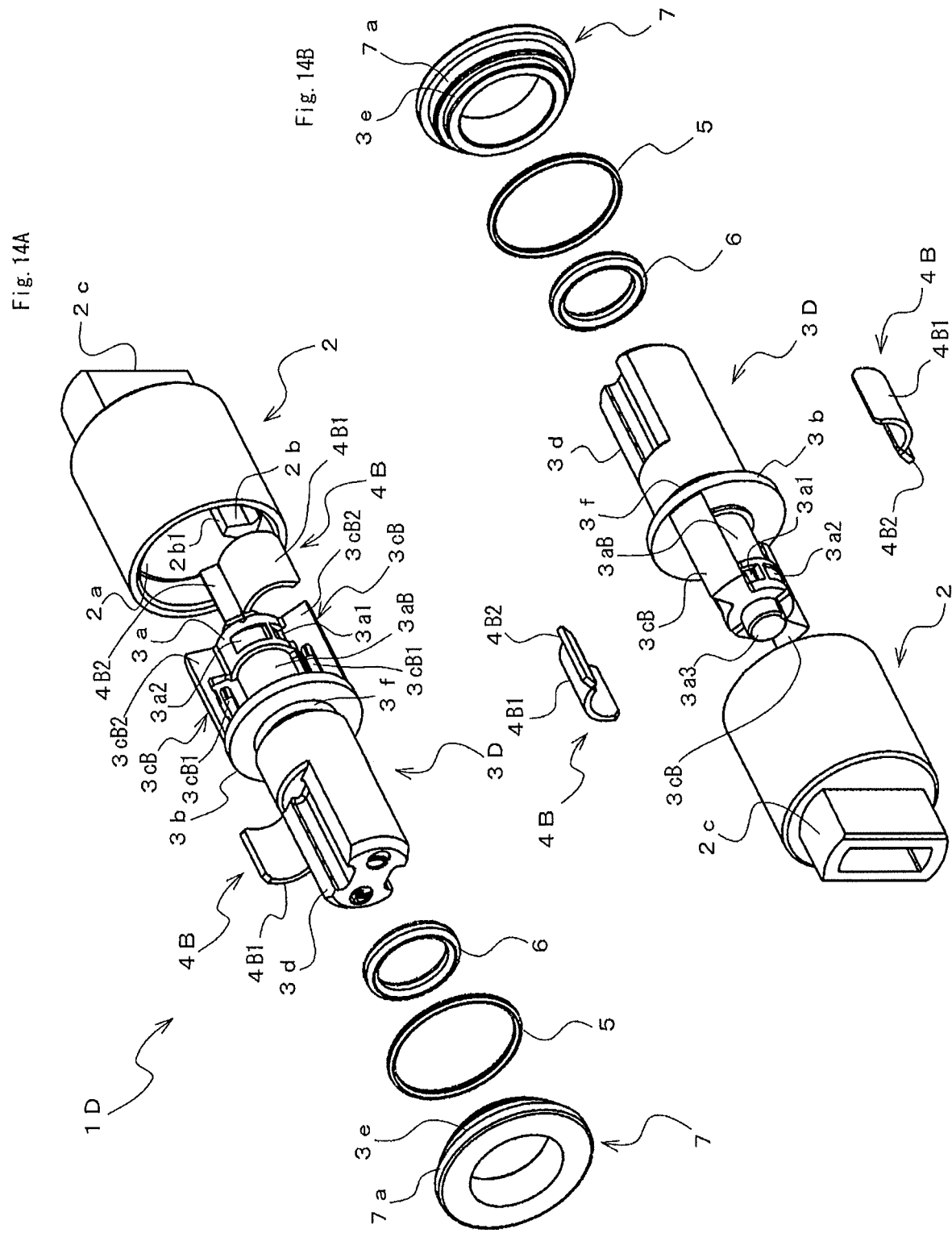

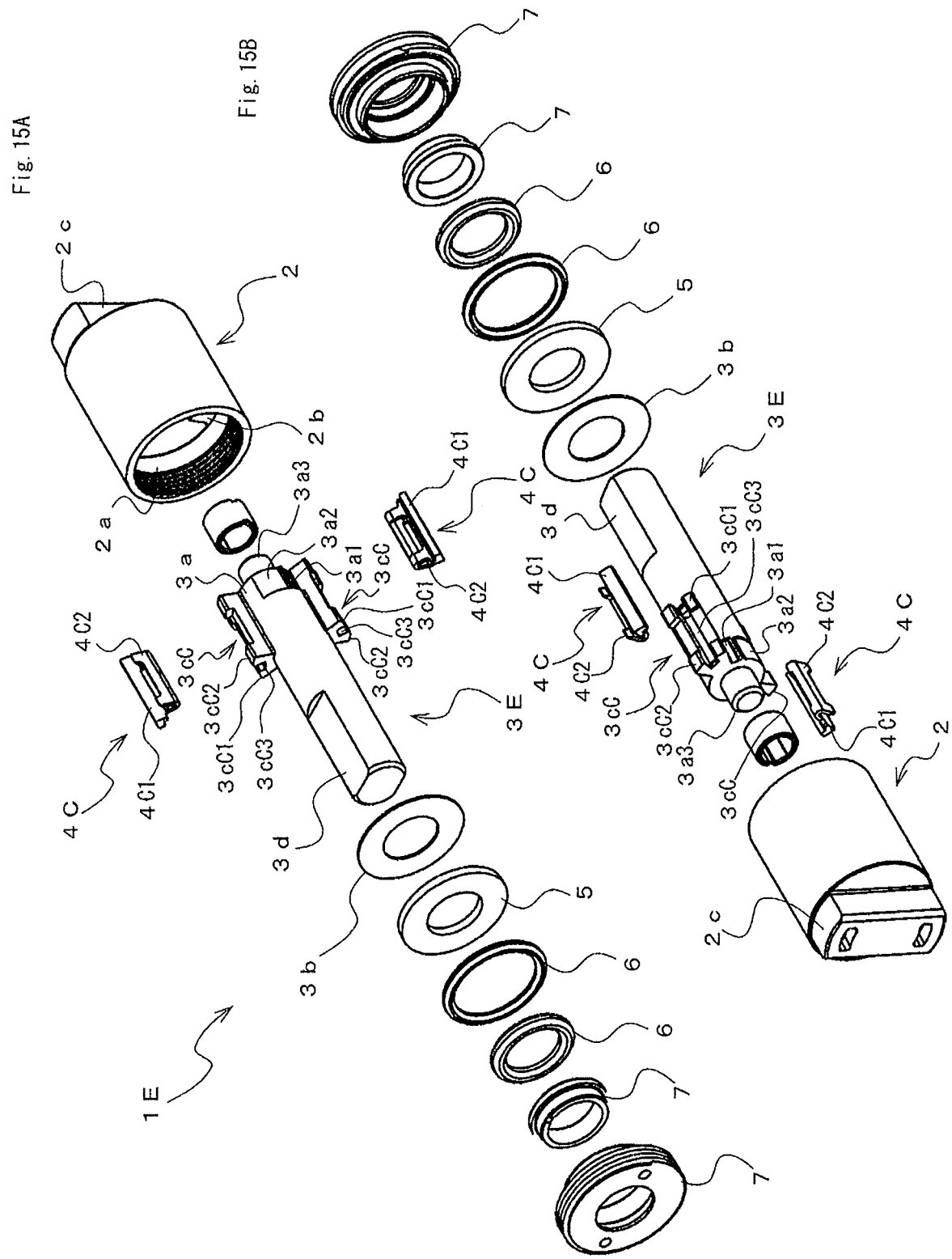

ROTARY DAMPER HAVING SIMPLE SELF-STANDING MECHANISM

TECHNICAL FIELD

The present invention relates to a rotary damper which cushions an opening/closing operation of an opening/closing member by applying a braking force to the opening/closing operation, and more particularly to a rotary damper having a self-standing mechanism which simply allows the opening/closing member to be in a self-standing state.

BACKGROUND ART

In the related art, as this type of rotary damper, for example, there is a rotary damper disclosed in Patent Document 1 for simply allowing a toilet lid of a western-style toilet to be in a self-standing state.

The rotary damper having this simple self-standing mechanism includes a cylindrical housing having a pressure chamber filled with a viscous fluid, a rotating member incorporated in the housing, and a valve member installed in the rotating member. The rotating member includes a shaft portion incorporated in the pressure chamber, and a concave space serving as a flow path for the viscous fluid is formed in the shaft portion. The concave space is deepest at a position close to a root portion of the blade portion formed on an outer periphery of the shaft portion, and gradually becomes shallower and is flush with an outer peripheral surface of the shaft portion. When the toilet lid of the western-style toilet moves in an opening direction, the rotating member rotates in the clockwise direction, and a flow path of the viscous fluid is formed by a distal end of a partition wall formed in an inner periphery of the housing and the concave space. A size of this flow path gradually increases as the toilet lid is opened, and is the maximum immediately before the toilet lid is in a self-standing state. Therefore, a force for opening the toilet lid gradually decreases as the size of the flow path gradually increases. Thereafter, at an end of the operation of opening the toilet lid, the flow path is closed and cut off, and the force for opening the toilet lid is large immediately before the toilet lid is in a self-standing state. If the toilet lid is opened beyond this closed position, the self-standing of the toilet lid is possible.

RELATED ART DOCUMENT

Patent Document

[Patent Document 1] JP-A-2015-227719

SUMMARY OF THE INVENTION

Problem that the Invention is to Solve

However, in the rotary damper having the simple self-standing mechanism of the related art disclosed in Patent Document 1, at the end of the operation of opening the toilet lid, a repulsive force in a closing direction from an opening direction of the toilet lid is generated in the toilet lid, and thus, there is an inconvenience that the toilet lid bounces.

Means for Solving the Problem

The present invention is to solve the above-described problems. According to an aspect of the present invention, there is provided a rotary damper having a simple self-standing mechanism, including: a housing of which one end is open and the other end is closed and which has a pressure chamber to be filled with a viscous fluid in which a pair of partition walls protruding at a predetermined height toward an axis is formed at facing positions on an inner periphery in a depth direction; a rotating member which includes a shaft portion which is rotatably accommodated in the pressure chamber and whose outer periphery is close to the partition wall, a pressure acting plate which partitions the pressure chamber into a closed end side and an open end side between which the partition wall is interposed in an axial direction of the shaft portion, a blade portion which is formed on the outer periphery of the shaft portion in the pressure chamber partitioned to the closed end side so as to extend in the axial direction of the shaft portion protruding at a predetermined height, and an attached portion which is coaxially formed with the shaft portion and protrudes from the housing and is attached to an opening/closing member; and a sealing member which seals the pressure chamber, in which a main flow path of the viscous fluid is formed around the shaft portion when the rotating member rotates in one direction, and the main flow path is closed when the rotating member rotates in the other direction, characterized in that the rotating member includes a pair of the blade portions, a pair of the first grooves, and a pair of the second grooves at opposite positions on the outer periphery of the shaft portion, wherein the first groove forming a secondary flow path of the main flow path between the partition wall and the first groove in a rotational position of the rotating member where the opening/closing member self-stands is formed at a predetermined length in a circumferential direction on the outer periphery of the shaft portion from a base of the blade portion, the second groove forming a secondary flow path of the main flow path between the partition wall and the second groove in a rotational position of the rotating member up to the opening/closing member uprightly stands from the rotating member rotates in the one direction is formed at a predetermined length in the circumferential direction on the outer periphery of the shaft portion at a predetermined interval with the first groove in the circumferential direction of the shaft portion, and the outer periphery of the shaft portion existing at the predetermined interval spaced between the first groove and the second groove is close to a top portion of the partition wall in the rotational position of the rotating member where the opening/closing member uprightly stands, and closes the secondary flow path of the main flow path formed between the partition wall and the first groove or the second groove.

According to the present configuration, the attached portion of the rotating member is fixedly attached to an opening/closing member such as a toilet lid of a western-style toilet, and the first groove and the second groove are formed on the outer periphery of the shaft portion to have a predetermined positional relationship. Accordingly, the viscous fluid passes through the secondary flow path formed between the second groove and the partition wall along with the main flow path until the opening/closing member is opened and is immediately before in a self-standing state, and an opening force decreases. However, the opening/closing member is opened and is immediately before in the self-standing state, the secondary flow path is blocked by the outer periphery of the shaft portion between the second groove and the first groove, and a braking force is applied, and thus, the opening force increases. If the opening/closing member is opened beyond a position at which the opening force increases, the opening/closing member can be in a self-standing state by the braking force. In addition, if the opening/closing member is opened beyond the position at which the opening force increases, the secondary flow path of the viscous fluid and the main flow path are formed between the first groove and the partition wall again, and at an end of a self-standing operation, the braking force is not applied. Therefore, an inconvenience of bounce generated at the end of the operation of opening the opening/closing member in the related art is eliminated. That is, the inconvenience of the bounce caused by a repulsive force generated in the opening/closing member from the opening direction of the opening/closing member to the closing direction thereof in the related art is eliminated.

According to the present configuration, the flow paths of the viscous fluid are formed symmetrically at opposite positions between which the axis of the shaft portion of the rotating member is interposed. Therefore, a force biased to rotational braking of the rotating member is not applied, and thus, rotational braking of the rotating member is performed stably. Further, a rotational braking force can be secured, and rotational braking of the opening/closing member can be performed reliably.

Moreover, in the present invention, the second groove may have a bottom surface which is deepest at one end on the first groove side and is shallower as a distance from the first groove increases, and in which the other end portion away from the first groove is flush with an outer peripheral surface of the shaft portion.

According to the present configuration, the secondary flow path of the viscous fluid formed between the second groove and the partition wall gradually increases until the opening/closing member is opened and the opening/closing member is immediately before in the self-standing state, and the force for opening the opening/closing member gradually decreases. Accordingly, the opening operation of the opening/closing member can be performed smoothly, and operability of the opening/closing member is improved.

In addition, in the present invention, the rotary damper may further include a valve member which is mounted on the blade portion or the shaft portion, forms the main flow path of the viscous fluid around the shaft portion between the blade portion and the valve member or between an inner surface of the pressure chamber and the valve member when the rotating member rotates in one direction, and closes the main flow path if the rotating member rotates in the other direction.

According to the present configuration, the opening or closing of the main flow path of the viscous fluid is performed by the valve member.

Advantage of the Invention

According to the present invention, it is possible to provide a rotary damper having a simple self-standing mechanism which does not cause an inconvenience such as bounce of an opening/closing member at an end of an opening operation of the opening/closing member such as toilet lid.

BRIEF DESCRIPTION OF THE DRAWINGS

FIG. 5A is a front view of a shaft constituting the rotary damper having a simple self-standing mechanism according to the first embodiment, and FIG. 5B is a side view thereof.

FIG. 6 is a partially broken sectional view of the rotary damper having a simple self-standing mechanism according to the first embodiment.

FIG. 8A is a front view of a vane constituting the rotary damper having a simple self-standing mechanism according to the first embodiment, FIG. 8B is a plan view thereof, FIG. 8C is a bottom view thereof, and FIG. 8D is a left side view thereof.

FIG. 9 is a partially broken plan view of a western-style toilet to which the rotary damper having a simple self-standing mechanism according to the first embodiment is applied.

FIGS. 10A to 10E are cross-sectional views showing a movement inside the rotary damper having the simple self-standing mechanism according to the first embodiment during an opening operation of a toilet seat/toilet lid shown in FIG. 9, and FIGS. 10F to 10J are cross-sectional views showing a movement inside the rotary damper during a closing operation of the toilet seat/toilet lid.

FIG. 11A is a side view of a shaft included in the rotary damper according to the first modification example, and FIG. 11B is a partially broken sectional view of the rotary damper according to the first modification example.

FIG. 12A is a side view of a shaft included in the rotary damper according to the second modification example, and FIG. 12B is a partially broken sectional view of the rotary damper according to the second modification example.

FIGS. 13A and 13B each shows a rotary damper according to a second embodiment of the present invention, FIG. 13A is an exploded perspective view when the rotary damper according to the second embodiment is viewed from one side, and FIG. 13B is an exploded perspective view when the rotary damper is viewed from the other side.

FIGS. 14A and 14B each shows a rotary damper according to a third embodiment of the present invention, FIG. 14A is an exploded perspective view when the rotary damper according to the third embodiment is viewed from one side, and FIG. 14B is an exploded perspective view when the rotary damper is viewed from the other side.

FIGS. 15A and 15B each shows a rotary damper according to a fourth embodiment of the present invention, FIG. 15A is an exploded perspective view when the rotary damper according to the fourth embodiment is viewed from one side, and FIG. 15B is an exploded perspective view when the rotary damper is viewed from the other side.

BEST MODE FOR CARRYING OUT THE INVENTION

Next, embodiments of a rotary damper having a simple self-standing mechanism according to the present invention will be described.

Figure 1:
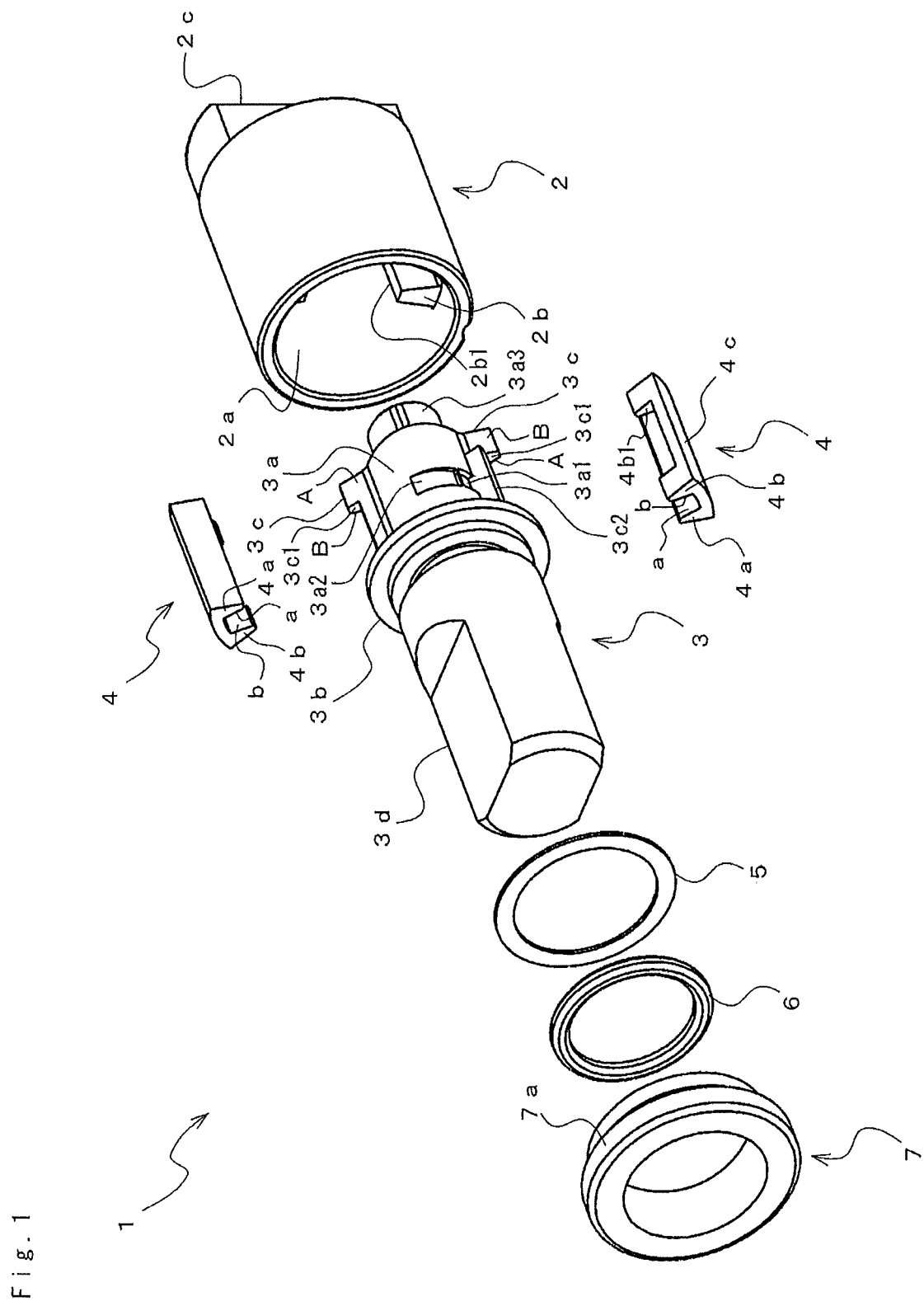
FIG. 1 is an exploded perspective view when a rotary damper having a simple self-standing mechanism according to a first embodiment of the present invention is viewed from one side.
Figure 2:
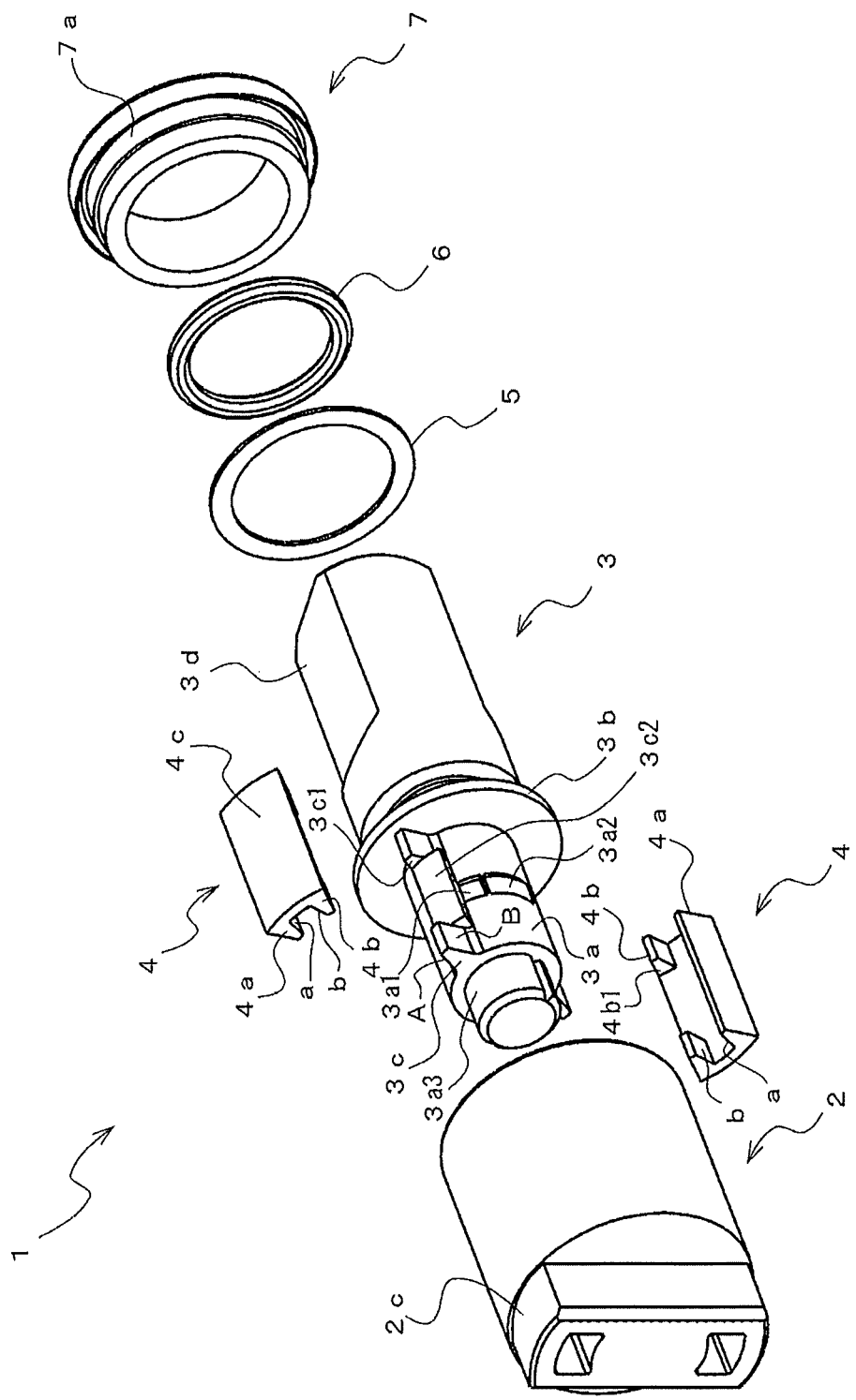
FIG. 2 is an exploded perspective view when the rotary damper having a simple self-standing mechanism according to the first embodiment is viewed from the other side.

FIG. 1 is an exploded perspective view when a rotary damper having a simple self-standing mechanism according to a first embodiment of the present invention is viewed from one side, and FIG. 2 is an exploded perspective view when the rotary damper is viewed from the other side.

A rotary damper 1 includes a housing 2, a shaft 3, vanes 4, a sliding member 5, an O ring 6, and a cap 7 as main components.

The housing 2 is formed in a cylindrical shape having one end opened and the other end closed, and a pressure chamber 2a formed in an internal space of the housing 2 is filled with a viscous fluid (not shown) such as a silicon oil. In the pressure chamber 2a, partition walls 2b are formed on an inner peripheral surface in a depth direction of the pressure chamber 2a. In addition, a locking portion 2c having a substantially rectangular parallelepiped shape is provided outside a closed end side of the housing 2. As shown in a front view of FIG. 3, a pair of partition walls 2b is provided at positions facing each other on the inner periphery of the pressure chamber 2a, a cross-sectional shape of each partition wall 2b has a substantially fan shape, and each partition wall 2b protrudes toward an axis of the housing 2 to have a predetermined height.

Figure 3:
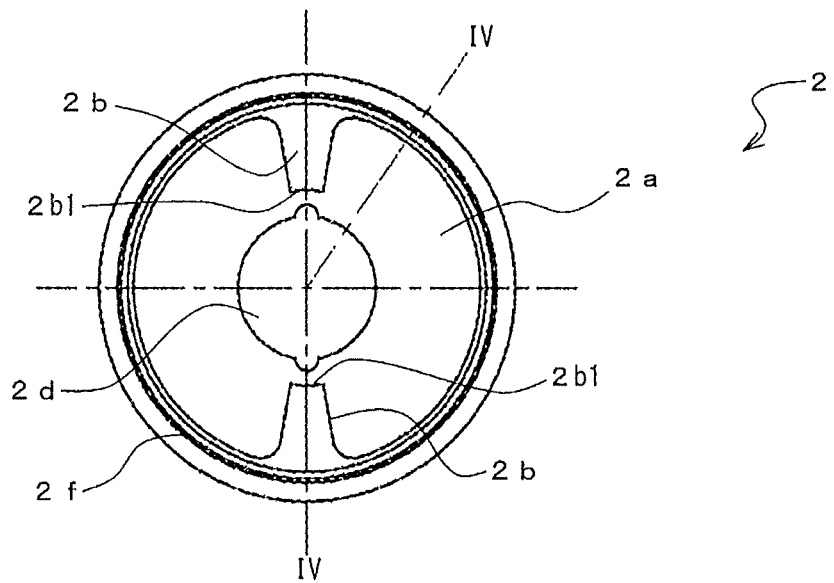
FIG. 3 is a front view of a pressure chamber of a housing constituting the rotary damper having a simple self-standing mechanism according to the first embodiment.
Figure 4:
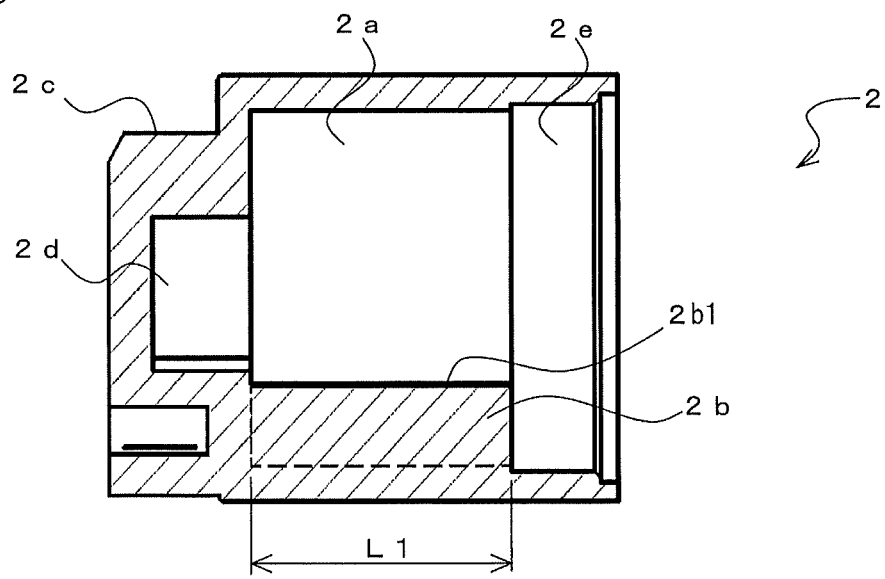
FIG. 4 is a longitudinal sectional view taken along line IV-IV of the housing shown in FIG. 3.

FIG. 4 is a longitudinal sectional view of the housing 2 taken along line IV-IV of FIG. 3. A shaft support portion 2d which is open in a columnar shape with a small diameter is formed coaxially with the shaft portion 3a on an end surface on the closed end side inside the housing 2. Further, a joining inner diameter portion 2e having a slightly larger diameter and a smaller width than the pressure chamber 2a is formed on an opened end side of the housing 2.

FIG. 5A is a front view of the shaft 3, and FIG. 5B is a side view thereof. The shaft 3 constitutes a rotating member having the shaft portion 3a, a pressure acting plate 3b, blade portions 3c, and an attached portion 3d as main components.

The shaft portion 3a has a small diameter portion 3a3 on an end portion thereof. The small diameter portion 3a3 is inserted into the shaft support portion 2d of the housing 2, an outer periphery of the pressure acting plate 3b is close to an inner periphery of the joining inner diameter portion 2e, and thus, as shown in a partially broken sectional view of the rotary damper 1 shown in FIG. 6, the shaft 3 is attached to the housing 2. By this attachment of the shaft 3, the shaft portion 3a is rotatably accommodated in the pressure chamber 2a of the housing 2. A top portion 2b1 of the partition wall 2b is formed in a curved surface shape to have a slight gap from the outer periphery of the shaft portion 3a, and the outer periphery of the shaft portion 3a is close to the top portion 2b1 of the partition wall 2b.

In an axial direction of the shaft portion 3a, the pressure acting plate 3b partitions the pressure chamber 2a on the closed end side of the housing 2 and an open end side of the housing 2 between which the partition wall 2b is interposed. An area S2 on an end surface of the pressure acting plate 3b facing the pressure chamber 2a on the open end side of the housing 2 is set to be larger than an area S1 on an opposite end surface of the pressure acting plate 3b facing the pressure chamber 2a on the closed end side.

The blade portions 3c which extend in the axial direction of the shaft portion 3a protruding at a predetermined height and have a trapezoidal cross-sectional shape are formed on the outer periphery of the shaft portion 3a in the pressure chamber 2a partitioned to the closed end side. A pair of blade portions 3c is provided at opposite positions on the outer periphery of the shaft portion 3a, and in each blade portion 3c, a portion of a center portion interposed between both end portions is cut out at a predetermined length to form a cutout portion 3c1. A length L2 in a longitudinal direction of the blade portion 3c is set slightly shorter than a length L1 of the partition wall 2b. Moreover, there is no protrusion on one side surface A of the blade portion 3c. However, a base portion 3c2 of the cutout portion 3c1 is formed on the other side surface B to protrude in a circumferential direction of the shaft portion 3a.

Figure 7:
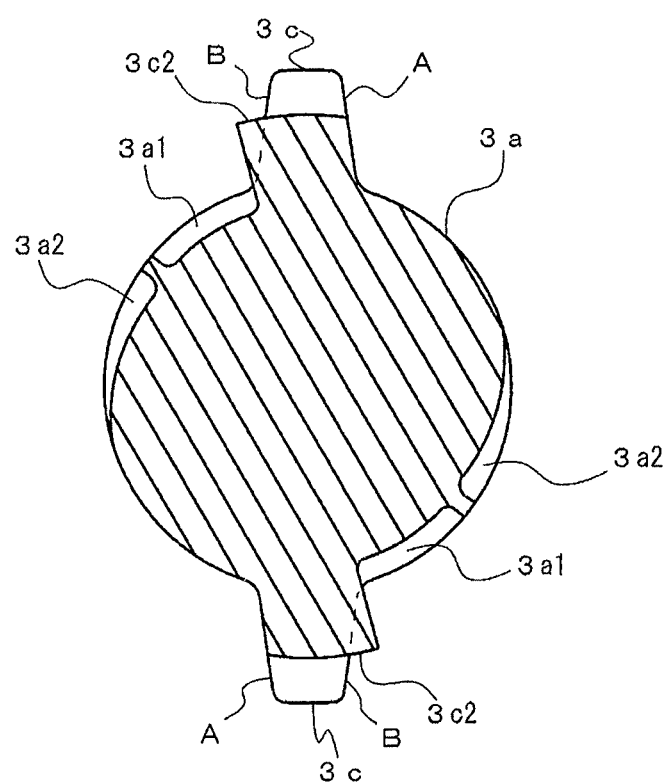
FIG. 7 is a transverse sectional view of a shaft portion of the shaft constituting the rotary damper having a simple self-standing mechanism according to the first embodiment.

On the other side surface B side of each blade portion 3c, a first groove 3a1 is formed with a predetermined length and a predetermined width in the circumferential direction from a base of the blade portion 3c to the outer periphery of the shaft portion 3a. Further, on the outer periphery of the shaft portion 3a spaced from the first groove 3a1 at a predetermined interval, a second groove 3a2 is formed with a predetermined length and a predetermined width in the circumferential direction. As shown in a transverse sectional view of the shaft portion 3a shown in FIG. 7, in the present embodiment, the second groove 3a2 has a bottom surface which is deepest at one end on the first groove 3a1 side and is shallower as a distance from the first groove 3a1 increases, and in which the other end portion away from the first groove 3a1 is flush with the outer peripheral surface of the shaft portion 3a. The first groove 3a1 has a bottom surface having the same constant depth as the deepest depth of the second groove 3a2. The bottom surface of the second groove 3a2 is a columnar surface having an axis at a position away from the axis of the shaft portion 3a. However, the bottom surface of the second groove 3a2 is not limited to the shape, and, for example, may be a flat surface, a surface having a positive constant curvature, a surface having a negative constant curvature, or the like.

The attached portion 3d is formed coaxially with the shaft portion 3a in a state where the pressure acting plate 3b is interposed therebetween. If the shaft portion 3a is accommodated in the pressure chamber 2a, the attached portion 3d protrudes from the housing 2. As shown in FIG. 5, a sliding member attachment portion 3e and an O ring attachment portion 3f are formed between the attached portion 3d and the pressure acting plate 3b from the pressure acting plate 3b side.

FIG. 8A is a front view of the vane 4, FIG. 8B is a plan view thereof, FIG. 8C is a bottom view thereof, and FIG. 8D is a left side view thereof.

The vane 4 includes a pair of side walls 4a and 4b and a connection portion 4c as main components and constitutes a valve member. The connection portion 4c connects the side walls 4a and 4b to each other. In the one side wall 4a, an inner surface a abuts against the one side surface A of the blade portion 3c, and thus, the one side wall 4a blocks the cutout portion 3c1 of the blade portion 3c. In the other side wall 4b, an inner surface b abuts against the other side surface B of the blade portion 3c. A cutout portion 4b1 which opens the cutout portion 3c1 of the blade portion 3c when the inner surface b abuts against the other side surface B is formed on the other side wall 4b. A pair of vanes 4 is provided in the shaft 3 such that the side walls 4a and 4b of each vane 4 straddle so as to sandwich each blade portion 3c with a predetermined play. In this case, an inner periphery 4c1 of the connection portion 4c is in sliding contact with the top portion of the blade portion 3c, and an outer periphery 4c2 thereof is in sliding contact with the inner periphery of the pressure chamber 2a partitioned to the closed end side.

A length L3 in a longitudinal direction of the vane 4 is set to be approximately the same as the length L2 of the blade portion 3c. The vane 4 is attached across the blade portion 3c, and thus, the cutout portion 4b1 sandwiches the base portion 3c2 of the blade portion 3c with a slight play.

Accordingly, both ends in a longitudinal direction of the vane 4 form slight gaps between a closed end of the pressure chamber 2a and the pressure acting plate 3b.

The sliding member 5 is a thin hollow disk, is attached to the sliding member attachment portion 3e of the shaft 3, and is interposed between the shaft 3 and the cap 7. Wear caused by contact between the shaft 3 and the cap 7 is reduced by the sliding member 5. In the present embodiment, the sliding member 5 is formed of a polymer compound, and a wear resistance thereof is secured. The O ring 6 is formed of an elastic member such as rubber and is attached to the O ring attachment portion 3f of the shaft 3. The viscous fluid filling the pressure chamber 2a is prevented from leaking from a portion between the shaft 3 and the cap 7 by the O ring 6. The cap 7 and the O ring 6 constitute a sealing member which seals the pressure chamber 2a.

The cap 7 has a hollow cylindrical shape having a flange portion at one end. A joining outer diameter portion 7a (refer to FIGS. 1 and 2) on an outer periphery of a cylindrical portion of the cap 7 comes into contact with the joining inner diameter portion 2e (refer to FIG. 4) of the housing 2. Accordingly, the cap 7 is attached to the housing 2, and thus, an opening end of the housing 2 is blocked. The cap 7 and the housing 2 are fixed to each other by joining the joining outer diameter portion 7a and the joining inner diameter portion 2e to each other by ultrasonic welding or the like.

For example, the rotary damper 1 having the above-described configuration is used in a hinge device which opens and closes a toilet seat/toilet lid 11b in a western-style toilet 11 shown in FIG. 9. In this case, the locking portions 2c of the housing 2 are fixed to a main body 11a of the western-style toilet 11, and the attached portion 3d of the shaft 3 is attached to a braking object to be rotationally braked, that is, the toilet seat/toilet lid 11b.

FIGS. 10A to 10E are cross-sectional views showing a movement inside the rotary damper 1 during an opening operation of the toilet seat/toilet lid 11b, and FIGS. 10F to 10J are cross-sectional views showing a movement inside the rotary damper 1 during a closing operation of the toilet seat/toilet lid 11b. The cross-sectional views are views when the inside of the rotary damper 1 attached to a side portion of the toilet seat/toilet lid 11b on a side opposite to the side shown in FIG. 9 is viewed from the opened end side of the housing 2.

The pressure chamber 2a on the closed end side of the housing 2 is partitioned into a first pressure chamber P1 and a second pressure chamber P2 around the axis of the shaft portion 3a by the partition walls 2b and the shaft portion 3a of the shaft 3. In addition, the pressure chamber 2a partitioned by the pressure acting plate 3b on the open end side of the housing 2 becomes a third pressure chamber P3 (refer to FIG. 6). Each of the pressure chambers P1, P2, and P3 is filled with the viscous fluid.

FIG. 10A shows an internal state of the rotary damper 1 in a state where the toilet seat/toilet lid 11b is closed and an opening angle is 0°. In this state, the side surface A of each blade portion 3c abuts against the inner surface a of the side wall 4a of each vane 4, and the side surface B of each blade portion 3c and the inner surface b of the side wall 4b of each vane 4 are separated from each other. If the opening of the toilet seat/toilet lid 11b starts from this state, the shaft 3 rotates in the counterclockwise direction when viewed from the open end side of the housing 2. If the shaft 3 rotates in the counterclockwise direction, as shown in FIG. 10B, the side surface A of the blade portion 3c is separated from the inner surface a of the side wall 4a of the vane 4, and the side surface B of the blade portion 3c abuts against the inner surface b of the side wall 4b of the vane 4. In this state, a gap is formed between the side surface A of the blade portion 3c and the inner surface a of the side wall 4a of the vane 4, and a first flow path F1 passing through the gap via the cutout portion 4b1 of the vane 4 and the cutout portion 3c1 of the blade portion 3c is formed as a main flow path. Moreover, a second flow path F2 is formed in a gap formed between one end in the longitudinal direction of the vane 4 and the closed end of pressure chamber 2a, and a third flow path F3 is formed in a gap formed between the other end in the longitudinal direction of the vane 4 and the pressure acting plate 3b3 (refer to FIG. 6). Accordingly, the viscous fluid in the pressure chambers P1 and P2 is moved from a front side in the rotation direction to a rear side in the rotation direction through the first flow path F1, the second flow path F2, and the third flow path F3 by the counterclockwise rotation of the shaft 3. However, since the second flow path F2 and the third flow path F3 are smaller than the first flow path F1 and the first flow path F1 is set to a sufficiently large size, the viscous fluid passes through the first flow path F1 without receiving a large resistance. For this reason, a light rotational torque is applied to the rotation of the shaft 3, and thus, the toilet seat/toilet lid 11b is moved by a light force as a whole.

If the toilet seat/toilet lid 11b is further opened from the state shown in FIG. 10B and reaches a state shown in FIG. 10C, the fourth flow path F4 passing through the second grooves 3a2 formed on the outer periphery of the shaft portion 3a is formed as a secondary flow path between the top portion 2b1 of the partition wall 2b and the shaft portion 3a. If the fourth flow path F4 is formed, a resistance applied to the viscous fluid moving from the front side in the rotation direction to the rear side in the rotation direction is weakened. If the toilet seat/toilet lid 11b is further opened, the size of the fourth flow path F4 increases as the depth of the second groove 3a2 increases, and the resistance applied to the viscous fluid is further weakened up to a state where the toilet seat/toilet lid 11b stands uprightly as shown in FIG. 10D. For this reason, during this time, the rotational torque applied to the rotation of the shaft 3 gradually decreases, and a force for opening the toilet seat/toilet lid 11b gradually decreases.

If the toilet seat/toilet lid 11b reaches the uprightly standing state shown in FIG. 10D, the outer periphery of the shaft portion 3a existing between the second groove 3a2 and the first groove 3a1 is in contact with the top portion 2b1 of the partition wall 2b, and the fourth flow path F4 is cut off. For this reason, the rotational torque applied to the rotation of the shaft 3 increases, and the force for opening the toilet seat/toilet lid 11b increases. When this state is exceeded, the toilet seat/toilet lid 11b can be in a self-standing state. Thereafter, if the toilet seat/toilet lid 11b is further opened and the first groove 3a1 formed on the outer periphery of the shaft portion 3a reaches the top portion 2b1 of the partition wall 2b, the fifth flow path F5 is formed as the secondary flow path. If the fifth flow path F5 is formed, the rotational torque applied to the rotation of the shaft 3 is weakened again, and the force for opening the toilet seat/toilet lid 11b is reduced again. In this state, if the toilet seat/toilet lid 11b is further opened, the toilet seat/toilet lid 11b is finally opened at an angle of 110° as shown in FIG. 10E and the self-standing state of the toilet seat/toilet lid 11b is maintained.

Meanwhile, during the closing operation of the toilet seat/toilet lid 11b, if the closing of the toilet seat/toilet lid 11b starts from the state where the toilet seat/toilet lid 11b is opened at the angle of 110° as shown in FIG. 10F, the shaft 3 is rotates in the clockwise direction when viewed from the opened end side of the housing 2. If the shaft 3 rotates in the clockwise direction, as shown in FIG. 10G, the side surface A of the blade portion 3c abuts against the inner surface a of the side wall 4a of the vane 4, and the side surface B of the blade portion 3c is separated from the inner surface b of the side wall 4b of the vane 4. In this state, the cutout portion 3c1 formed in the blade portion 3c is blocked by the inner surface a of the side wall 4a of the vane 4, and the first flow path F1 passing through the cutout portion 4b1 of the vane 4 and the cutout portion 3c1 of the blade portion 3c is closed. Accordingly, the viscous fluid in the pressure chambers P1 and P2 moves from the front side in the rotation direction to the rear side in the rotation direction through the second flow path F2 and the third flow path F3 formed by slight gaps. Accordingly, the resistance applied to the viscous fluid increases, and the rotational torque applied to the rotation of the shaft 3 increases. Therefore, braking is applied to the closing operation of the toilet seat/toilet lid 11b, and the toilet seat/toilet lid 11b is closed slowly as a whole.

The state shown in FIG. 10G is a state where the toilet seat/toilet lid 11b stands upright from the angle of 110° shown in FIG. 10F to the angle of 90°, and during this time, the fifth flow path F5 is formed between the first groove 3a1 and the top portion 2b1 of the partition wall 2b. Therefore, the braking applied to the closing operation of the toilet seat/toilet lid 11b is slightly weakened. However, if the toilet seat/toilet lid 11b reaches the uprightly standing state shown in FIG. 10G, the outer periphery of the shaft portion 3a existing between the first groove 3a1 and the second groove 3a2 comes into contact with the top portion 2b1 of the partition wall 2b, and the fifth flow path F5 is closed. Accordingly, the braking applied to the closing operation of the toilet seat/toilet lid 11b increases. Accordingly, if the toilet seat/toilet lid 11b is in the self-standing state, a closing speed is once lowered.

Thereafter, if the shaft portion 3a reaches the state shown in FIG. 10H, the fourth flow path F4 is formed between the second groove 3a2 and the top portion 2b1 of the partition wall 2b. The fourth flow path F4 gradually decreases as the second groove 3a2 gradually becomes shallow until the shaft portion 3a reaches the state shown in FIG. 10I. For this reason, the braking applied to the rotation of the shaft 3 is slightly weakened again by the formation of the fourth flow path F4, but gradually increases. Accordingly, if the toilet seat/toilet lid 11b reaches the state shown in FIG. 10H, a closing speed slightly increases. However, thereafter, the closing speed gradually decreases until the toilet seat/toilet lid 11b reaches the state shown in FIG. 10I. Thereafter, the toilet seat/toilet lid 11b is slowly closed at a constant slow speed until the toilet seat/toilet lid 11b reaches an angle of 0° completely closed as shown in FIG. 10J.

Moreover, since the area S2 of the end surface of the pressure acting plate 3b of the shaft 3 facing the third pressure chamber P3 is larger than the area S1 of the opposite end surface facing the pressure chambers P1 and P2, a pressure is applied to the pressure chambers P1 and P2 by the pressure acting plate 3b in the axial direction of the shaft 3 from the pressure chamber P3. Therefore, volumes of the flow paths F1, F2, F3, F4, and F5 located on the pressure chambers P1 and P2 side are reduced, and a flow resistance of the viscous fluid located on the pressure chambers P1 and P2 side increases. Here, this phenomenon is referred to as a pressure acting plate effect.

If the toilet seat/toilet lid 11b moves in the opening direction, the flow path F1, F2, F3, F4 and F5 are reduced by this pressure acting plate effect. However, since the flow path F1 is set to a sufficient size, the flow path F1 is not greatly affected by the viscous fluid. On the contrary, if the toilet seat/toilet lid 11b moves in the closing direction, the flow paths F2, F3, F4, and F5 are reduced by the pressure acting plate effect. Accordingly, the flow resistance of the viscous fluid increases, and the self-standing state of the toilet seat/toilet lid 11b is firmly maintained, and a greater sense of self standing can be obtained.

According to the rotary damper 1 of the present embodiment, the attached portion 3d of the shaft 3 is fixedly attached to the toilet seat/toilet lid 11b of the western-style toilet 11, and the first groove 3a1 and the second groove 3a2 are formed on the outer periphery of the shaft portion 3a to have a predetermined positional relationship. Accordingly, the viscous fluid passes through the fourth flow path F4 formed between the second groove 3a2 and the partition wall 2b until the toilet seat/toilet lid 11b is opened and is immediately before in a self-standing state, and the opening force decreases. However, before the toilet seat/toilet lid 11b is opened and is immediately before in the self-standing state, the fourth flow path F4 is blocked by the outer periphery of the shaft portion 3a between the second groove 3a2 and the first groove 3a1, the braking force is applied, and thus, the opening force increases. If the toilet seat/toilet lid 11b is opened beyond the position at which the opening force increases, the toilet seat/toilet lid 11b can be in a self-standing state by the braking force. In addition, if the toilet seat/toilet lid 11b is opened beyond the position at which the opening force increases, the fifth flow path F5 is formed between the first groove 3a1 and the partition wall 2b, and at the end of the self-standing operation, the braking force is not applied. Therefore, an inconvenience of bounce generated at the end of the operation of opening the toilet seat/toilet lid 11b in the related art is eliminated. That is, the inconvenience of the bounce caused by a repulsive force generated in the toilet seat/toilet lid 11b from the opening direction of the toilet seat/toilet lid 11b to the closing direction thereof in the related art is eliminated.

In addition, according to the rotary damper 1 of the present embodiment, the fourth flow path F4 of the viscous fluid formed between the second groove 3a2 and the partition wall 2b gradually increases until the toilet seat/toilet lid 11b is opened and the toilet seat/toilet lid 11b is immediately before in the self-standing state, and the force for opening the toilet seat/toilet lid 11b gradually decreases. Accordingly, the opening operation of the toilet seat/toilet lid 11b can be performed smoothly, and operability of the toilet seat/toilet lid 11b is improved.

Moreover, according to the rotary damper 1 of the present embodiment, the flow paths F1, F2, F3, F4, and F5 of the viscous fluid are formed symmetrically at opposite positions between which the axis of the shaft portion 3a of the shaft 3 is interposed. Therefore, a force biased to rotational braking of the shaft 3 is not applied, and thus, the rotational braking of the shaft 3 is performed stably. Further, a rotational braking force can be secured, and the rotational braking of the toilet seat/toilet lid 11b can be performed reliably.

In the present embodiment, the pressure acting plate 3b is integrally formed with the shaft 3. However, the pressure acting plate 3b and the shaft 3 may be formed separately from each other to be combined with each other.

Figure 11A:
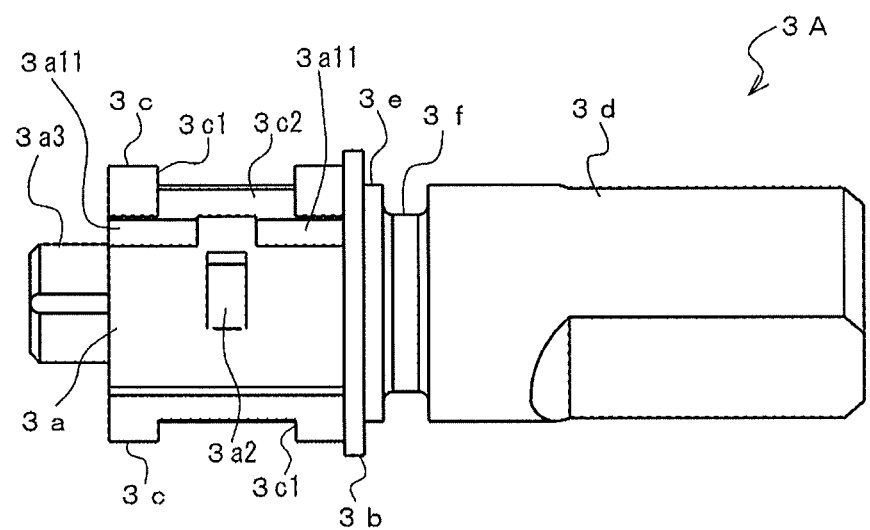
FIGS. 11A and 11B each shows a rotary damper according to a first modification example of the first embodiment.
Figure 11B:
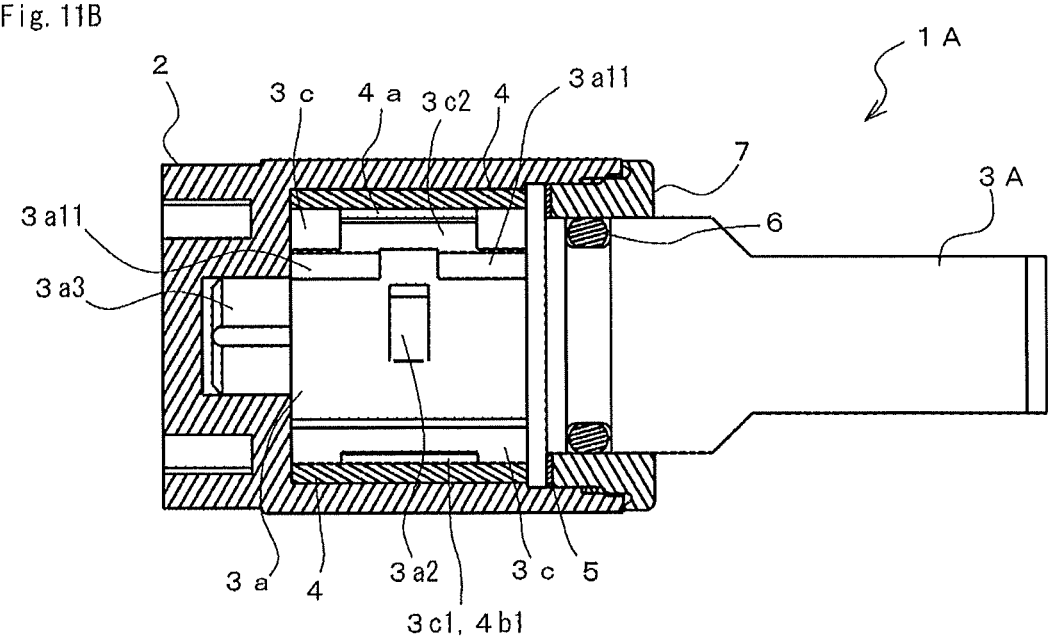

In the first embodiment, the case is described in which the first groove 3a1 is formed at a predetermined length from the center portion of the base of the blade portion 3c to the outer periphery of the shaft portion 3a so as to have the same width as that of the second groove 3a2 at a predetermined interval between the first groove 3a1 and the end portion of the second groove 3a2. However, like a shaft 3A shown in FIG. 11, first grooves 3a11 and 3a11 may be formed instead of the first groove 3a1. That is, the first grooves 3a11 and 3a11 are formed on both outer peripheries of the shaft portion 3a between which the center portion of the base of the blade portion 3c is interposed, at a predetermined length in a circumferential direction from the base of the blade portion 3c at a predetermined interval between the first grooves 3a11 and 3a11 and the circumferential position of the end portion of the second groove 3a2. FIG. 11A is a side view of the shaft 3A, and FIG. 11B is a partially broken sectional view of a rotary damper 1A according to a first modification example including the shaft 3A instead of the shaft 3. Moreover, in FIGS. 11A and 11B, the same reference numerals are assigned to portions which are the same as or correspond to those in FIGS. 5A, 5B and 6, and descriptions thereof are omitted. Similarly to the first groove 3a1, each of the first grooves 3a11 and 3a11 has a bottom surface having a constant depth. However, a formation area thereof is wider than that of the first groove 3a1. Accordingly, even when a depth of each first groove 3a11 is shallower than the deepest depth of the second groove 3a2, a flow rate of the viscous fluid flowing through the fifth flow path F5 can be the same as that of the first embodiment.

Figure 12A:
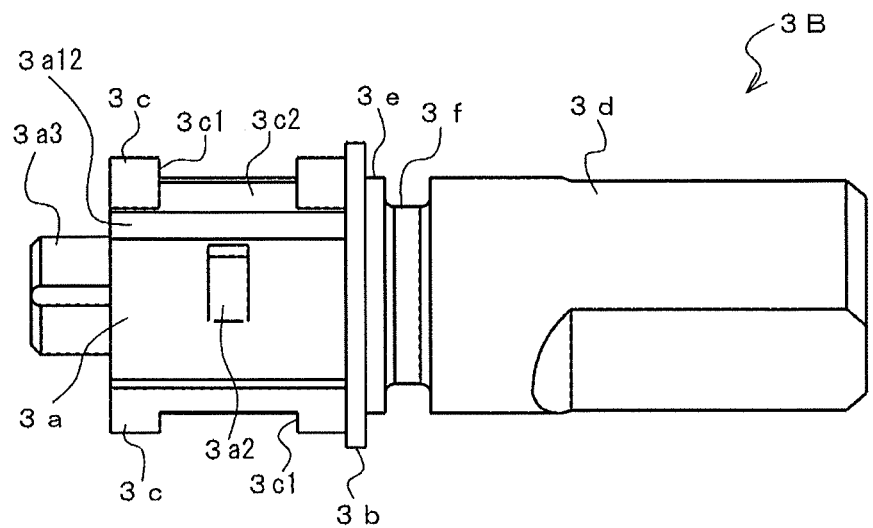
FIGS. 12A and 12B each shows a rotary damper according to a second modification example of the first embodiment.
Figure 12B:
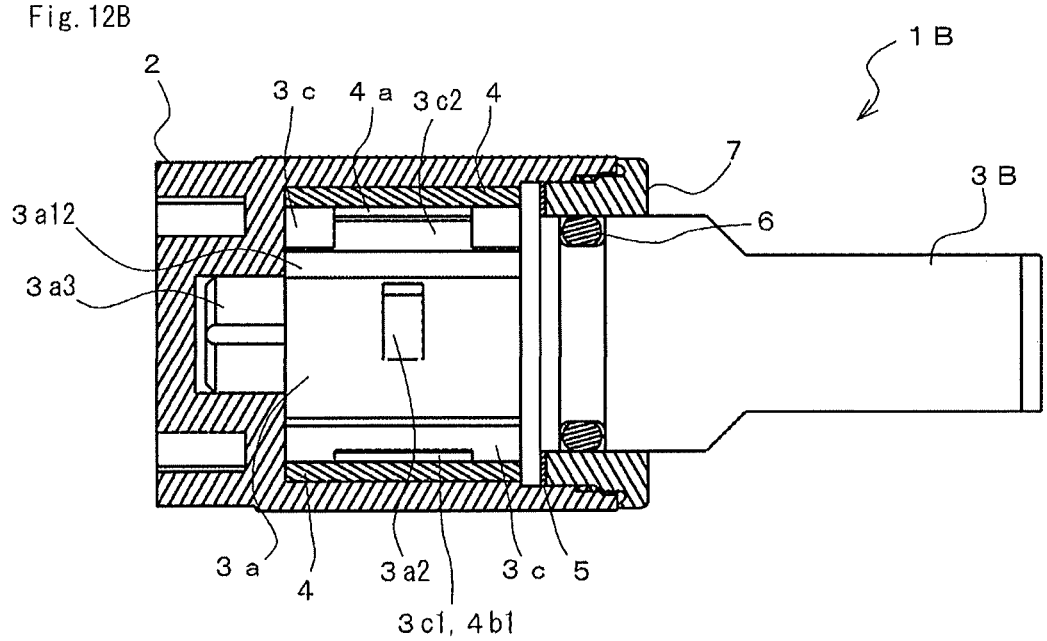

Moreover, like a shaft 3B shown in FIGS. 12A and 12B, a first groove 3a12 may be formed instead of the first groove 3a1. That is, the first groove 3a12 is formed on the outer periphery of the shaft portion 3a in the entire region of the base of the blade portion 3c, at a predetermined length in a circumferential direction from the base of the blade portion 3c at a predetermined interval between the first grooves 3a12 and the circumferential position of the end portion of the second groove 3a2. FIG. 12A is a side view of the shaft 3B, and FIG. 12B is a partially broken sectional view of a rotary damper 1B according to a second modification example including the shaft 3B instead of the shaft 3. Moreover, in FIGS. 12A and 12B, the same reference numerals are assigned to portions which are the same as or correspond to those in FIGS. 5A, 5B and 6, and descriptions thereof are omitted. Similarly to the first groove 3a1, the first groove 3a12 has a bottom surface having a constant depth. However, a formation area thereof is wider than that of the first groove 3a1. Accordingly, even when a depth of the first groove 3a12 can be shallower than the deepest depth of the second groove 3a2.

Moreover, in the first embodiment, the valve mechanism is described in which, according to the rotation of the shaft 3, the first flow path F1 is opened through the cutout portion 4b1 formed in the other side wall 4b and the cutout portion 3c1 of the blade portion 3c by the vane 4 forming the gap between the one side wall 4a and the side surface A of the blade portion 3c, and the first flow path F1 is closed by the one side wall 4a of the vane 4 blocking the cutout portion 3c1 of the blade portion 3c.

However, similarly to the first embodiment, the first flow path F1 can be opened or closed by a C-type vane valve mechanism provided in a rotary damper 1C according to a second embodiment of the present invention shown in FIGS. 13A and 13B. Moreover, in FIGS. 13A and 13B, the same reference numerals are assigned to portions which are the same as or correspond to those in FIGS. 1 and 2, and descriptions thereof are omitted. In the C-type vane valve mechanism, a blade portion 3cA has a circular cross-sectional shape and does not have a cutout like the cutout portion 3c1. In a vane 4A, a circular concave portion 4A1 which is substantially the same as the circular cross section of the blade portion 3cA is formed on the inner periphery of the vane 4A along a longitudinal direction of the vane 4A. The concave portion 4A1 is fitted to the blade portion 3cA and the vane 4A is mounted on the blade portion 3cA, and thus, the vane 4A can be rotated by a predetermined angle around a center of the circular section of the blade portion 3cA. On an outer peripheral surface of the vane 4A, a close contact surface 4A2 which is in close contact with the inner periphery of the pressure chamber 2a and prevents the flow of the viscous fluid and a cutout portion 4A3 through which the viscous fluid can flow are formed. Moreover, a flat portion 4A4 is formed on a side surface of the vane 4A.

If the shaft 3C rotates in the counterclockwise direction when viewed from the closed end side of the housing 2, the flat portion 4A4 of the vane 4A receives a flow resistance due to the viscous fluid, and thus, the close contact surface 4A2 and the inner periphery of the pressure chamber 2a are in close contact with each other. Accordingly, the first flow path F1 is closed, the flow of the viscous fluid between the first pressure chamber P1 and the second pressure chamber P2 receives a great resistance, and a high torque is applied to a rotation of a braking object attached to the attached portion 3d. Meanwhile, if the shaft 3C rotates in the clockwise direction when viewed from the closed end side, the vane 4A rotates in a reverse direction around the circular center of the blade portion 3cA. Accordingly, the close contact between the close contact surface 4A2 and the inner periphery of the pressure chamber 2a is released, a gap is generated between the cutout portion 4A3 of the vane 4A and the inner periphery of the pressure chamber 2a, and thus, the first flow path F1 is opened. Therefore, a torque applied to the rotation of the braking object decreases.

In the rotary damper 1C having the C-type vane valve mechanism, the first groove 3a1 which forms the fifth flow path F5 between the partition wall 2b and the first groove 3a1 is formed on the outer periphery of the shaft portion 3a from a base of the blade portion 3cA at a predetermined length in a circumferential direction, and the second groove 3a2 which forms the fourth flow path F4 between the partition wall 2b and the second groove 3a2 is formed on the outer periphery of the shaft portion 3a at a predetermined length in a circumferential direction at a predetermined interval with the first groove 3a1. Accordingly, the same effect as those of the first embodiment are achieved.

Moreover, similarly to the first embodiment, the first flow path F1 can be opened or closed by a b-type vane valve mechanism provided in a rotary damper 1D according to a third embodiment of the present invention shown in FIGS. 14A and 14B. Moreover, in FIGS. 14A and 14B, the same reference numerals are assigned to portions which are the same as or correspond to those in FIGS. 1 and 2, and descriptions thereof are omitted. In the b-type vane valve mechanism, a blade portion 3cB includes a flow passage 3cB1 which penetrates in a rotation direction of the shaft portion 3a and a step portion 3cB2 against which the vane 4B abuts. A top portion of the step portion 3cB2 is in sliding contact with the inner periphery of the pressure chamber 2a. The vane 4B includes a curved portion 4B1 along the outer periphery of the shaft portion 3a, and a valve portion 4B2 which is continuous with the curved portion 4B1 and extends in a radial direction from the shaft portion 3a. On the outer periphery of the shaft portion 3a, a strip-shaped recessed portion 3aB is formed in the circumferential direction to be longer than a curve length of the curved portion 4B1. In the vane 4B, the curved portion 4B1 is fitted to the strip-shaped recessed portion 3aB, and thus, the vane 4B is mounted on the shaft portion 3a.

If the shaft 3D rotates in the counterclockwise direction when viewed from the closed end side of the housing 2, the valve portion 4B2 of the vane 4B abuts against the step portion 3cB2 of the blade portion 3cB to block the flow passage 3cB1. Accordingly, the first flow path F1 is closed, the flow of the viscous fluid between the first pressure chamber P1 and the second pressure chamber P2 receives a great resistance, and a high torque is applied to a rotation of a braking object attached to the attached portion 3d. Meanwhile, if the shaft 3D rotates in the clockwise direction when viewed from the closed end side, the curved portion 4B1 of the vane 4B moves in the strip-shaped recessed portion 3aB of the shaft portion 3a, the valve portion 4B2 is separated from the step portion 3cB2, and thus, the flow passage 3cB1 is opened. Accordingly, the first flow path F1 is opened. Therefore, a torque applied to a rotation of a braking object decreases.

In the rotary damper 1D having the b-type vane valve mechanism, the first groove 3a1 which forms the fifth flow path F5 between the partition wall 2b and the first groove 3a1 is formed on the outer periphery of the shaft portion 3a from the base of the blade portion 3cB at a predetermined length in a circumferential direction, and the second groove 3a2 which forms the fourth flow path F4 between the partition wall 2b and the second groove 3a2 is formed on the outer periphery of the shaft portion 3a at a predetermined length in a circumferential direction at a predetermined interval with the first groove 3a1. Accordingly, the same effect as those of the first embodiment are achieved.

In addition, similarly to the first embodiment, the first flow path F1 can be opened or closed by a J-type vane valve mechanism provided in a rotary damper 1E according to a fourth embodiment of the present invention shown in FIGS. 15A and 15B. Moreover, in FIGS. 15A and 15B, the same reference numerals are assigned to portions which are the same as or correspond to those in FIGS. 1 and 2, and descriptions thereof are omitted. In the J-type vane valve mechanism, a blade portion 3cC is configured to include a groove 3cC3 between a first side wall 3cC1 and a second side wall 3cC2. A cutout is formed in each of the first side wall 3cC1 and the second side wall 3cC2. The vane 4C includes a valve portion 4C1 and a spring portion 4C2 which is bent in a U shape, and a top portion of the valve portion 4C1 is in sliding contact with the inner periphery of the pressure chamber 2a. A cutout is formed in a lower portion of the valve portion 4C1 and an end portion of the spring portion 4C2. In the vane 4C, the spring portion 4C2 is inserted into a groove 3cC3 of the blade portion 3cC, and thus, the vane 4C is mounted on the blade portion 3cC.

When a shaft 3E is not rotated, in the vane 4C, a U-shaped wall portion of the spring portion 4C2 is in contact with a wall portion of the groove 3cC3, the cutout formed in the first side wall 3cC1 is blocked by the valve portion 4C1, and thus, the first flow path F1 is closed. Even when the shaft 3E rotates in the counterclockwise direction when viewed from the closed end side of the housing 2, the closed state of the first flow path F1 is not changed. Accordingly, the flow of the viscous fluid between the first pressure chamber P1 and the second pressure chamber P2 receives a great resistance, and a high torque is applied to a rotation of a braking object attached to the attached portion 3d. Meanwhile, if the shaft 3E rotates in the clockwise direction when viewed from the closed end side, the vane 4C receive the pressure of the viscous fluid from the outside of the valve portion 4C1, and the U-shaped wall portion of the spring portion 4C2 is separated from the wall portion of the groove 3cC3. Accordingly, the first flow path F1 is opened by a fluid passage formed by the cutout of the first side wall 3cC1 and the cutout on the lower side of the valve portion 4C1 and a fluid passage formed by the cutout of the second side wall 3cC2 and the cutout of the end portion of the spring portion 4C2. Therefore, a torque applied to the rotation of the braking object decreases.

In the rotary damper 1E having the J-type vane valve mechanism, the first groove 3a1 which forms the fifth flow path F5 between the partition wall 2b and the first groove 3a1 is formed on the outer periphery of the shaft portion 3a from a base of the blade portion 3cC at a predetermined length in a circumferential direction, and the second groove 3a2 which forms the fourth flow path F4 between the partition wall 2b and the second groove 3a2 is formed on the outer periphery of the shaft portion 3a at a predetermined length in a circumferential direction at a predetermined interval with the first groove 3a1. Accordingly, the same effect as those of the first embodiment are achieved.

INDUSTRIAL APPLICABILITY

In the embodiments, the case where the rotary damper having a simple self-standing mechanism according to the present invention is applied to the hinge device of the western-style toilet is described. However, the rotary damper having a simple self-standing mechanism according to the present invention is not limited to the western-style toilet hinge device. The rotary damper can be similarly applied to other opening/closing devices which support between objects in an openable/closable manner, and the same effects as those of the embodiments are achieved.

DESCRIPTION OF REFERENCE NUMERALS AND SIGNS

1: rotary damper
2: housing
2a: pressure chamber
2b: partition wall
2b1: top portion of partition wall 2b
2c: locking portion
2d: shaft support portion
2e: joining inner diameter portion
2f: female screw portion
3: shaft (rotating member)
3a: shaft portion
3a1: first groove
3a2: second groove
3a3: small diameter portion
3b: pressure acting plate
3c: blade portion
3c1: cutout portion
3c2: base portion
3d: attached portion
3e: sliding member attachment portion
3f: O ring attachment portion
4: vane (valve member)
4a, 4b: side wall
4b1: cutout portion of side wall 4b
4c: connection portion
4c1: inner periphery of connection portion 4c
4c2: outer periphery of connection portion 4c
5: sliding member
6: O ring (sealing member)
7: cap (sealing member)
A: one side surface of blade portion 3c
B: the other side surface of blade portion 3c a: inner surface of side wall 4a
b: inner surface of side wall 4b

The invention claimed is:

1. A rotary damper having a simple self-standing mechanism, comprising:
   a housing of which one end is open and the other end is closed, and which has a pressure chamber to be filled with a viscous fluid in which a pair of partition walls protruding at a predetermined height toward an axis is formed at facing positions on an inner periphery in a depth direction;
   a rotating member which includes a shaft portion which is rotatably accommodated in the pressure chamber and whose outer periphery is close to top portions of the partition walls, a pressure acting plate which partitions the pressure chamber into a closed end side and an open end side between which the partition walls are interposed in an axial direction of the shaft portion, a pair of blade portions which is formed at opposite positions on the outer periphery of the shaft portion in the pressure chamber partitioned at the closed end side so as to extend in the axial direction of the shaft portion protruding at a predetermined height, a pair of first grooves forming a first sub flow path of a main flow path with the top portions of the partition walls in a rotational position of the rotating member where the first grooves reach the top portions of the partition walls and an opening/closing member which opens and closes by rotation of the rotating member self-stands, the pair of first grooves is formed at opposite positions on the outer periphery of the shaft portion at a predetermined length in a circumferential direction directly on the outer periphery between the blade portions of the shaft portion from a base of each of the blade portions, a pair of second grooves each forming a second sub flow path of the main flow path with the top portions of the partition walls in a rotational position where the second grooves reach the top portions of the partition walls, the pair of second grooves is formed at opposite positions on the outer periphery of the shaft portion at a predetermined length in the circumferential direction directly on the outer periphery between the blade portions of the shaft portion at a predetermined interval with each of the first grooves in the circumferential direction of the shaft portion, and an attached portion which is coaxially formed with the shaft portion and protrudes from the housing and is attached to the opening/closing member; and
   a sealing member which seals the pressure chamber,
   wherein the main flow path of the viscous fluid is formed around the shaft portion when the rotating member rotates in the one direction, and the main flow path is closed when the rotating member rotates in the other direction, and
   the outer periphery of the shaft portion existing at the predetermined interval spaced between the first grooves and the second grooves is close to the top portions of the partition walls in the rotational position of the rotating member where the opening/closing member uprightly stands, and substantially closes the first sub flow path of the main flow path formed between the top portions of the partition walls and the first grooves or the second sub flow path of the main flow path formed between the top portions of the partition walls and the second grooves.

2. The rotary damper having a simple self-standing mechanism according to claim 1,
   wherein each of the second grooves has a bottom surface which is deepest at one end on the first grooves side and is shallower as a distance from the first grooves increases, and in which the other end portion away from the first grooves is flush with an outer peripheral surface of the shaft portion.

3. The rotary damper having a simple self-standing mechanism according to claim 1, further comprising:
   a pair of valve members which is mounted on the blade portions or the shaft portion, forms the main flow path of the viscous fluid around the shaft portion between the blade portions and the valve members or between an inner surface of the pressure chamber and the valve members when the rotating member rotates in the one direction, and closes the main flow path if the rotating member rotates in the other direction.

* * * * *